United States Patent [19]

Shrikhande

[11] 4,452,822

[45] Jun. 5, 1984

[54] EXTRACTION AND INTENSIFICATION OF ANTHOCYANINS FROM GRAPE POMACE AND OTHER MATERIAL

[75] Inventor: Anil J. Shrikhande, Madera, Calif.

[73] Assignee: United Vintners, Inc., San Francisco, Calif.

[21] Appl. No.: 379,158

[22] Filed: May 17, 1982

[51] Int. Cl.³ .............................................. A23L 1/277
[52] U.S. Cl. ........................................ 426/49; 426/50; 426/51; 426/655; 426/250; 426/540; 426/429; 426/431
[58] Field of Search ................. 426/250, 540, 655, 49, 426/50, 51, 429, 431

[56] References Cited

U.S. PATENT DOCUMENTS

| 2,369,042 | 2/1945 | Graham et al. | 426/51 |
| 3,236,655 | 2/1966 | Murch | 426/50 |
| 3,666,487 | 5/1972 | Yokotsuma | 426/50 |
| 4,027,042 | 5/1977 | Von Elbe | 426/51 |
| 4,320,009 | 3/1982 | Hilton | 426/540 |
| 4,371,552 | 2/1983 | Posorske | 426/50 |

*Primary Examiner*—Jeanette M. Hunter
*Attorney, Agent, or Firm*—Edward B. Gregg

[57] ABSTRACT

Extracting anthocyanin-containing pulp from a vegetable source with sulfur dioxide to form an extract, treating the extract with enzymes to reduce suspended solids, reducing the sulfur dioxide content of the extract, acidifying and recovering the anthocyanin by ion exchange resin.

11 Claims, No Drawings

EXTRACTION AND INTENSIFICATION OF ANTHOCYANINS FROM GRAPE POMACE AND OTHER MATERIAL

This invention relates to the extraction of anthocyanins from grape pomace and other source material and to the intensification of the color of the extracts.

Heretofore anthocyanins have been extracted from grape pomace by various procedures. A process that has been used employs sulfur dioxide for this purpose. The extract is passed through an ion exchange column to adsorb the anthocyanin material and the adsorbed material is eluted by means of acetone, alkali or dimethyl formamide (DMF). Disadvantages of the process include the presence of sulfur dioxide which interferes with adsorption of anthocyanins thereby requiring multiple column adsorption. Elution with alkali degrades the anthocyanins considerably while acetone and dimethyl formamide are not recognized food additives and their complete removal from anthocyanins must be accomplished before addition to any food products.

The anthocyanin extract is commonly known by its Italian name, enocianina, and will be referred to hereinafter sometimes by such name.

It is an object of the present invention to provide improvements in the production of anthocyanin coloring material from grape pomace and other sources.

It is a particular object of the invention to provide a process whereby the extracted anthocyanins are more intense in color.

The above and other objects of the invention will be apparent from the ensuing description and the appended claims.

In accordance with the present invention anthocyanin extract from red grape pomace having an intensified color is produced as follows. The specific examples refer to red grape pomace, which is the preferred source material, but other sources may be used such as cranberry, blackberry and raspberry pomace, red cabbage, and miracle fruit.

STEP 1

Dry pomace is mixed with hot, for example, 160° F. water and sulfur dioxide and the mixture is agitated. In this step the sulfur dioxide solubleizes the anthocyanins by dissociating them from macromolecules such as pectin, cellulose and proteins. The sulfur dioxide also acts, in its role as a reducing agent, to protect the anthocyanins from oxidation. A crude extract results which are separated from other material.

STEP 2

The crude extract is treated enzymatically to destroy colloidal pectin and to coagulate finely divided solids which otherwise form a haze. Suitable enzymes are pectinase to act on the pectins and fungal amylase to act on the haze. The liquid is separated from solids.

STEP 3

According to whether a standard or an intensified anthocyanin extract is desired one or the other of the following procedures is used.

Type A Extract—Add an oxident, preferably hydrogen peroxide, to the extract resulting from Step 2 to oxidize most of the sulfur dioxide, and add an acid, preferably sulfuric acid, to result in a pH of approximately 2.0.

Type B Extract—Repeat the procedure described above for Type A Extract but carry it out at an elevated temperature, for example, 100° F. After acidification add an aldeyde to produce an intensified anthocyanin which is much darker in visual appearance to anthocyanin.

STEP 4

The treated extract resulting from Step 3, Type A or Step 3, Type B is then treated in an ion exchange column to adsorb the anthocyanins. A suitable adsorbent resin is that known as ES861 which is offered for sale by Diamond Shamrock Company. It is a copolymer of styrene and divinyl benzene polymer. Other adsorbent resins may be used, such as S761 containing phenol-formaldehyde matrix (Diamond Shamrock Company), XAD 7 and XAD 8, which are based on crosslinked polymethacrylate structure (Rohm and Haas Company). The adsorbent resin is chosen to have a good affinity for anthocyanins. The column is then eluted by means of a suitable solvent, for example, 70-75% ethanol. Other solvents such as methanol and isopropanol can be used for effective elution but their complete removal from the eluted color is desirable before incorporation of color in food products. The eluted color concentrate in ethanol may be used as such. For example, it may be sold and added to food product such as carbonated and still beverages, cordials, beverage bases, fruit flavored syrups, vinegar, drinking yogurts, etc., or it may be distilled to remove alcohol thus producing an aqueous color concentrate.

The following specific Examples will serve further to illustrate the practice and advantages of the invention.

EXAMPLE 1—PRODUCTION OF TYPE A ENOCIANINA

Step 1—Extraction

One part of dry pomace is mixed with three parts of hot water (160° F.) and sulfur dioxide is introduced to provide 1200 ppm in the mixture. The pomace-water mixture is agitated for 15 minutes. After 15 minutes, the pomace-water slurry is pumped with a must pump to a valley press screen where free run liquid is allowed to drain and the remaining wet pomace is pressed with continuous presses to produce additional liquid. Both liquid fractions are pumped through a glycol chiller to a storage tank. This liquid extract is termed crude color extract. The pomace is that of red grapes.

Step 2—Enzyme Treatment (a) To the crude extract resulting from Step 1 is added 100-150 ppm of pectinase to depolymerize the residual pectin and 250 ppm of fungal amylase is added to precipitate the other colloidal hazy material present in the crude extract. This treatment takes 4-14 days depending upon the temperature of the extract, the amount of colloidal materials, etc.

(b) The crude extract after enzyme treatment and settling is racked off or filtered to produce primary color extract. The primary extract should be free from insoluble solids. Primary color extract can be stored up to 9-12 months at 35°-50° F.

Step 3

(a) Pump the primary extract into a feed tank.

(b) Agitate the primary extract by counter-current bubbling with nitrogen.

(c) While the liquid is in agitation, add hydrogen peroxide to reduce the sulfur dioxide content of the extract from 1200 ppm to 100–350 ppm. Mix for 5 minutes.

(d) Add concentrated (98%) sulfuric acid roughly in the amount of 1.24 gal sulfuric acid per 1000 gallons treated extract resulting from (c) to depress the pH of the extract to approximately 2.0. Mix for 5 minutes.

(e) After the above treatment, stop the nitrogen flow used for mixing.

Step 4—Concentration and Purification (a) Adsorption: The treated extract is continuously pumped into an ion exchange column consisting of special adsorbent resin which has a very good affinity for anthocyanins. A suitable resin is Duolite S861, a macroporous resin which is a polystyrene crosslinked by divinylbenzene. For each cubic foot (7.48 gallons), 25–30 cubic feet (187–224 gallons) of primary extract are passed through the resin at the rate of five bed volumes per hour (37.4 gal/hr). The resin adsorbs practically all of the color from the extract and also part of the tannins. The other water soluble constituents, namely residual alcohol (1.7–2%), bitartrates, sugars, and potassium and sodium salts are transferred into the column effluent, thus leaving the purified color adsorbed on the resin. The column effluent is collected for alcohol recovery.

(b) Elution: After 25–30 bed volumes of extract are treated on the column resin, 0.75 bed volume of 70–75% alcohol is pumped over the resin bed from a surge tank at a flow rate of 0.75 bed volume per hour. For one cubic foot of resin, it would amount to 5.61 gallons of 70–75% alcohol at a flow rate of 5.61 gallons/hr. After approximately 1 hour, water is pumped at a flow rate of 5.61 gallons/hr/cu ft of resin. Approximately 10–15 minutes later, the concentrated phase of color is collected in a separate tank and the process is continued for 1 hour until exactly 5.61 gallon/cubic foot of color concentrate (enocianina) is collected. After the color concentrate is collected, the flow rate of water is increased to 7.48 gallons/hr/cubic foot of resin and exactly 7.48 gallons/cubic foot of rinse water is collected. This is a rinse water fraction.

(c) Assume that the 25 bed volumes of primary extract have been adsorbed on 1 cubic foot of resin, i.e., $25 \times 7.48$ gallons = 187 gallons, and that the color has been eluted by 0.75 bed volume of alcohol, i.e., 5.61 gallons/cubic foot. The concentration factor achieved by adsorption and elution would be:

$$\frac{25 \times 7.48}{5.61} = 33.3 \text{ (fold concentration)}$$

This results in a concentrated red color which is drummed for sale as it is or alcohol can be removed by distillation and the aqueous color concentrate which will be roughly 46–66 fold concentrated could also be sold.

It was experimentally determined that this Type A enocianina contains 40–50% alcohol by volume. The rest of the alcohol used in the elution cycle will be in rinse water fractions varying from 15 to 20% alcohol by volume which can be distilled and recovered.

EXAMPLE 2—PRODUCTION OF TYPE B ENOCIANINA

Step 3A—Intensification of Anthocyanins

Steps 1, 2 and 4 are carried out as in Example 1. Step 3 is different and is described below.

The primary extract of Step 2 is treated as follows:

(a) Pump the primary extract through a heat exchanger to a desired temperature of $100\pm5°$ F. and receive in a feed tank.

(b) Agitate the heated primary extract by counter-current bubbling with nitrogen gas.

(c) While the liquid is in agitation, add hydrogen peroxide to reduce the sulfur dioxide content of extract from 1200 ppm to 100–350 ppm. Mix for 5 minutes.

(d) Add concentrated sulfuric acid, roughly 1.24 gallon/1000 gallons, to depress the pH of the extract to approximately 2.0. Mix for 5 minutes.

(e) Add 500 ppm acetaldehyde, roughly 0.65 gallons/1000 gallons, and mix for 5 minutes.

(f) After all the above treatments, stop the flow of nitrogen used for mixing and allow the extract to stand for 3.5–4 hours.

The product of Step 3A is then treated as in Step 4 of Example 1. This produces intensified anthocyanin called Type B.

GENERAL DISCUSSION

In the extraction step (Step 1) heat acts to accelerate diffusion of anthocyanin from the grape skins. Sulfur dioxide combines with and solubilizes the anthocyanins and dissociates them from cellulose, pectin, proteins, etc., and it also protects the anthocyanins from oxidation. Pectinase destroys colloidal pectin and amylase assists in coagulating cellulosic material which causes haze. The coagulated material is more easily separated from the extract. Filtration and decanting remove insoluble material to produce a clear extract which can be treated by adsorbent resin to separate the anthocyanins from soluble material. Hydrogen peroxide reduces the sulfur dioxide content and prevents it from interfering with adsorption on an adsorbent resin. Alternatively sulfur dioxide can be stripped from primary extract by heat and vapor-liquid separator. Sulfuric acid prevents co-pigment formation between anthocyanins and other flavonoids, proteins, etc. which would result in precipitation of anthocyanins as a blue colloidal sediment. Also a pH of 2.0 (which may vary from 1.5 to 2.5) increases adsorption kinetics by 50% (Table 2) and causes more anthocyanins to be adsorbed on the resin. This makes possible a greater concentration of color on elution. Other acids such as phosphoric and hydrochloric acid may be used in place of sulfuric acid. Table 1 compares Type A and Type B extracts. The resin employed in Examples 1 and 2 (Duolite S861) is described in literature of the manufacture as having no chemical groups and as adsorbing the hydrophobic parts of the molecules to be adsorbed.

TABLE 1

VISUAL COMPARISON OF 0.25% SOLUTION OF TYPE A (UNINTENSIFIED) AND TYPE B (INTENSIFIED) ENOCIANINA IN pH 3.0 BUFFER (AQUEOUS SOLUTION)

| SOLUTION | ABSORBANCE AT 520 nm | ABSORPTION MAXIMA | COLOR | VISUAL COMPARISON |
|---|---|---|---|---|
| Type A | 0.76 | 520 | Ruby Red | |
| Type B | 0.76 | 535 | Purplish-Red | 3-4 fold |

TABLE 1-continued
VISUAL COMPARISON OF 0.25% SOLUTION OF TYPE A (UNINTENSIFIED) AND TYPE B (INTENSIFIED) ENOCIANINA IN pH 3.0 BUFFER (AQUEOUS SOLUTION)

| SOLUTION | ABSORBANCE AT 520 nm | ABSORPTION MAXIMA | COLOR | VISUAL COMPARISON |
|---|---|---|---|---|
| | | | | darker than Type A |

In producing Type B Enocianina the heating accelerates the intensification of color. The acetaldehyde combines with the 100–350 ppm sulfur dioxide left after peroxide treatment and it reacts with anthocyanins and other tannins to produce intensified chromophores. These intensified chromophores are purplish-red in color and are 3–4 times darker in visual appearance than unintensified anthocyanins as in Type A.

The intensified pigment in the extract which is submitted to adsorption is effectively deposited on the adsorbent resin. Further, this step separates the intensified anthocyanins from water soluble impurities which also includes unutulized acetaldehyde. Also by timing the adsorption step the duration of reaction of acetaldehyde with the extract can be controlled. By concentrating the anthocyanins on the ion exchange column, separating them from the aqueous phase and substances dissolved in it, then eluting the adsorbed anthocyanin with a relatively small volume of solvent, a three or fourfold intensification of color is achieved as shown in Table 1.

Referring to Table 1 it will be seen that the absorbence at 520 nm is the same for Type A and Type B but the hue and intensity are quite different.

As stated above any vegetable source material may be employed which contains extractable anthocyanins, grape pomace being the preferred source material. Grape pomace may be what is known as sweet pomace, from which the juice of the grape has been pressed. It is referred to as sweet pomace because it contains sugars. The grape pomace may also be what is known as fermented dry pomace which results from crushing the grapes to produce must which is fermented with the seeds and skins. Both types of pomace contain, typically, about 50% moisture. The grapes may be, for example, ruby cabernet, carignane, valdepena, zinfandel, grenache, barbera, rubired, petite sirah, cabernet sauvignon or mixtures thereof.

Instead of sulfuric acid, phosphoric acid or hydrochloric acid may be used in Step 3. Suitable acid concentrations are as follows:

| Sulfuric acid | 0.1 to 0.15% of 95–98% $H_2SO_4$ |
|---|---|
| Phosphoric acid (85% $H_3PO_4$) | 0.5 to 1.0% |
| Hydrochloric acid (36% HCl) | 0.06 to 0.1% |

Examples of end products containing the anthocyanin extract of the present invention are as follows. The anthocyanin is added in the form of a 40 to 50% solution in ethanol.

| Strawberry/cherry Soda | 0.35–0.5% Type A |
|---|---|
| Grape Soda | 0.2–0.3% Type B |
| Alcoholic Cordials | 0.1–0.2% Type A or Type B |
| Grape Drink | 0.2–0.3% Type B |
| Blueberry Yogurt | 0.1–0.15% Type B |
| Red Vinegar | 0.05% Type A |
| Rose Wines | 0.3% Type A |
| Burgundy Wines | 1.0% Type B |

It will be understood that the conditions set forth in the specific examples are preferred and that one may depart from such preferred conditions. For example the heating during Step 1 may be carried out at 100° F. to 170° F. Lower temperatures may result in slow or incomplete extraction and higher temperatures may degrade the extract. The sulfur dioxide concentration in Step 1 may vary, for example, from 500 to 2000 ppm. The hydrogen perioxide used in Step 3 is used in quantity sufficient to reduce the sulfur dioxide content to about 100 to 350 ppm. The alcohol used for elution may be 50 to 75% (by volume) ethanol. The sulfuric acid used in Step 3 may vary from, for example, 1 to 1.5 gallons per 1000 gallons of extract. The heating in Step 3, Type B may be to 85° to 130° F. The acidification in Step 3 has the advantage that it greatly increases adsorption of anthocyanins as shown by Table 2.

TABLE 2
INCREASE IN ADSORPTION KINETICS OF ANTHOCYANINS ON ES 861

| TREATMENT OF PRIMARY EXTRACT | pH OF PRIMARY EXTRACT | NUMBER OF BED VOLUMES OF EXTRACT ADSORBED | PERCENT INCREASE IN ADSORPTION KINETICS BY ACIDIFICATION |
|---|---|---|---|
| Unacidified | 3.0–3.2 | 20 | — |
| Acidified with Sulfuric acid | 2.0–2.2 | 30 | 50 |

It will therefore be apparent that a new and useful method of extracting red coloring material (anthocyanin) from vegetable sources, a method of concentrating and enhancing the color of the extract and a new coloring material are provided.

I claim:

1. In a method for the production of red coloring material suitable for use as a colorant for food and beverages, wherein anthocyanin-containing pump from a vegetable source material is extracted with sulfur dioxide to form an extract of anthocyanin material, the improvement which comprises treating the sulfur dioxide extract enzymatically to reduce or eliminate solid material present in the extract and further treating the extract to recover the final coloring material.

2. The method of claim 1 wherein the vegetable source material is a pomace.

3. The method of claim 2 wherein the pomace is derived from red grapes.

4. The method of claim 3 wherein the enzymatic treatment comprises adding pectinase to destroy colloidal pectin and amylase to destroy haze forming solids.

5. The method of claim 1 wherein the extract is further treated by oxidizing a portion of the sulfur dioxide, reducing the pH, and adsorbing the anthocyanins onto an ion exchange medium.

6. A method of producing an anthocyanin extract from the pulp of a vegetable source material comprising the following steps:
   (a) treating the vegetable source material with an aqueous solution of sulfur dioxide at an elevated temperature to extract anthocyanin material.

(b) treating the extract enzymatically to eliminate suspended solid material, (c) reducing the sulfur dioxide content of the resulting extract while leaving sufficient sulfur dioxide to protect the anthocyanin material from oxidation, and acidifying the extract, (d) adsorbing the anthocyanin material from the product of step (c) onto an ion exchange resin and (e) eluting the adsorbed anthocyanin material.

7. The method of claim 6 wherein the reduction of sulfur dioxide content in step (c) is accomplished by adding hydrogen peroxide.

8. The method of claim 6 wherein the reduction of sulfur dioxide content in step (c) is accomplished by heating.

9. A method of producing an anthocyanin extract from the pulp of a vegetable source material comprising the following steps:

(a) treating the vegetable source material with an aqueous solution of sulfur dioxide at an elevated temperature to extract anthocyanin material, (b) treating the extract enzymatically to eliminate suspended solid material, (c) heating the treated extract resulting from step (b), reducing the sulfur dioxide content of the heated extract while leaving sufficient sulfur dioxide to protect the anthocyanin material from oxidation, then acidifying the extract, and then adding acetaldehyde, (d) adsorbing the anthocyanin material from the product of step (c) onto an ion exchange resin and (e) eluting the adsorbed anthocyanin material.

10. The product of the method of claim 4.

11. The product of the method of claim 9.

* * * * *